United States Patent
Braun

(10) Patent No.: US 9,014,543 B1
(45) Date of Patent: Apr. 21, 2015

(54) METHODS AND SYSTEMS CONFIGURED FOR PROCESSING VIDEO FRAMES INTO ANIMATION

(71) Applicant: Max Benjamin Braun, Mountain View, CA (US)

(72) Inventor: Max Benjamin Braun, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/658,087

(22) Filed: Oct. 23, 2012

(51) Int. Cl.
- *G06K 9/62* (2006.01)
- *G06K 9/36* (2006.01)
- *H04N 19/182* (2014.01)

(52) U.S. Cl.
CPC .................................. *H04N 19/182* (2013.01)

(58) Field of Classification Search
None
See application file for complete search history.

(56) References Cited

U.S. PATENT DOCUMENTS

| | | | |
|---|---|---|---|
| 8,160,390 B1 | 4/2012 | Sandrew et al. | |
| 8,217,931 B2 | 7/2012 | Lowe et al. | |
| 2002/0118875 A1* | 8/2002 | Wilensky | 382/173 |
| 2003/0012277 A1* | 1/2003 | Azuma et al. | 375/240.08 |
| 2003/0194131 A1* | 10/2003 | Zhao et al. | 382/190 |
| 2004/0105493 A1* | 6/2004 | Kondo et al. | 375/240.08 |
| 2006/0083428 A1* | 4/2006 | Ghosh et al. | 382/224 |
| 2007/0086675 A1* | 4/2007 | Chinen et al. | 382/284 |
| 2009/0028432 A1 | 1/2009 | Rossato et al. | |
| 2009/0110299 A1* | 4/2009 | Panahpour Tehrani et al. | 382/224 |
| 2009/0110319 A1* | 4/2009 | Campbell et al. | 382/260 |

OTHER PUBLICATIONS

Kim et al., "Dynamic 3D Scene Reconstruction in Outdoor Environments", accessed at http://www.ee.surrey.ac.uk/CVSSP/, (2010).

* cited by examiner

*Primary Examiner* — Thai Tran
*Assistant Examiner* — Sunghyoun Park
(74) *Attorney, Agent, or Firm* — McDonnell Boehnen Hulbert & Berghoff LLP

(57) ABSTRACT

Methods and systems configured for processing video frames into animation is provided. An example method includes receiving a video including a plurality of frames, and determining an amount of change per pixel across a portion of the plurality of frames. Based on the amount of change per pixel, a first masking frame may be generated indicative of modifiable pixels and a second masking frame may be generated indicative of static background pixels. The first masking frame can be applied to frames of the plurality of frames to generate a plurality of partial frames, and the second masking frame can be applied to a given frame to generate a background template frame. The background template frame can be combined with each of the plurality of partial frames to generate a plurality of altered frames, and the plurality of altered frames can be processed into a second animation.

18 Claims, 8 Drawing Sheets

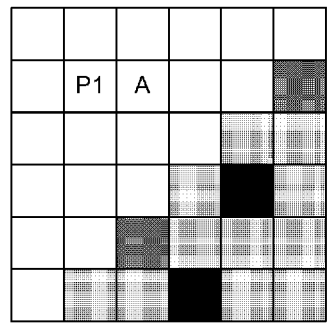
FRAME F1
FIGURE 4A
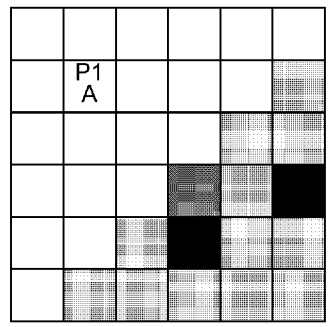
FRAME F2
FIGURE 4B
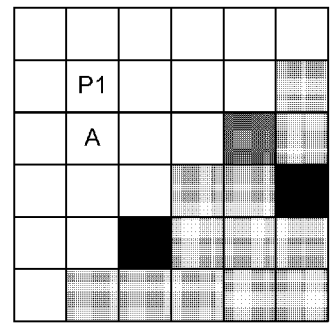
FRAME F3
FIGURE 4C
MASK M1
FIGURE 5A
MASK M2
FIGURE 5B
MASK M3
FIGURE 5C
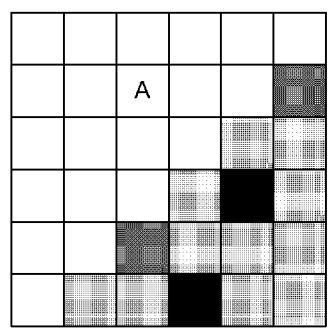
F1' = (F1 x M2) + (F1 x M3)
FIGURE 6A
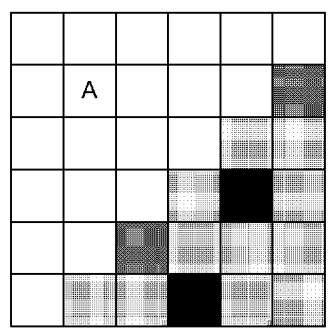
F2' = (F2 x M2) + (F1 x M3)
FIGURE 6B
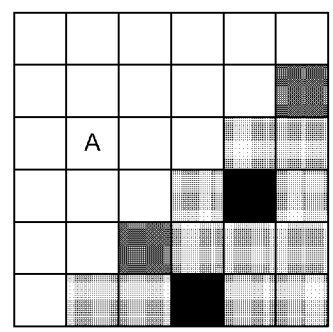
F3' = (F3 x M2) + (F1 x M3)
FIGURE 6C

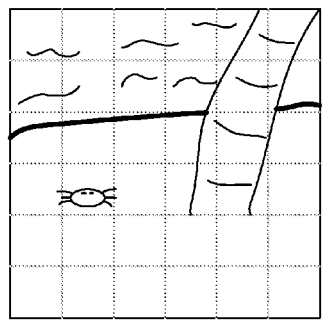 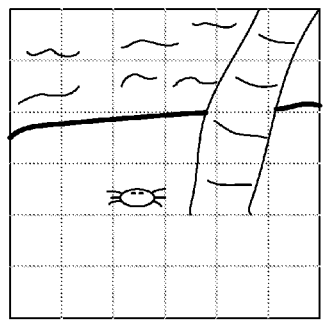 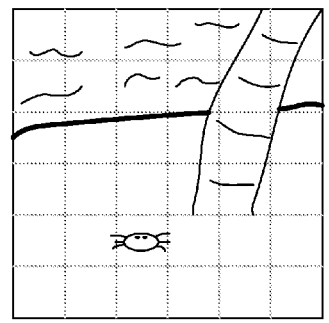
FRAME F1     FRAME F2     FRAME F3
FIGURE 7A     FIGURE 7B     FIGURE 7C
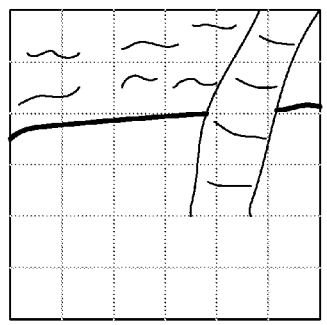
MASK M3
FIGURE 8
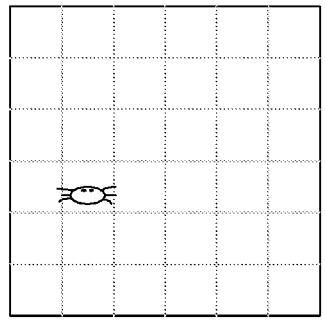 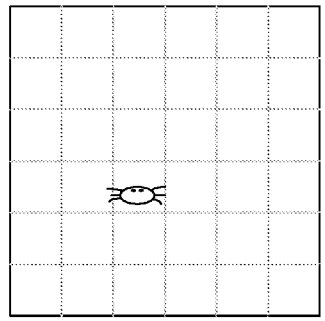 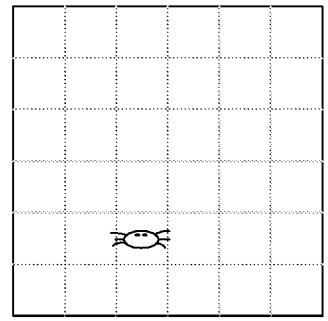
F1' = (F1 x M2)     F2' = (F2 x M2)     F3' = (F3 x M2)
FIGURE 9A     FIGURE 9B     FIGURE 9C

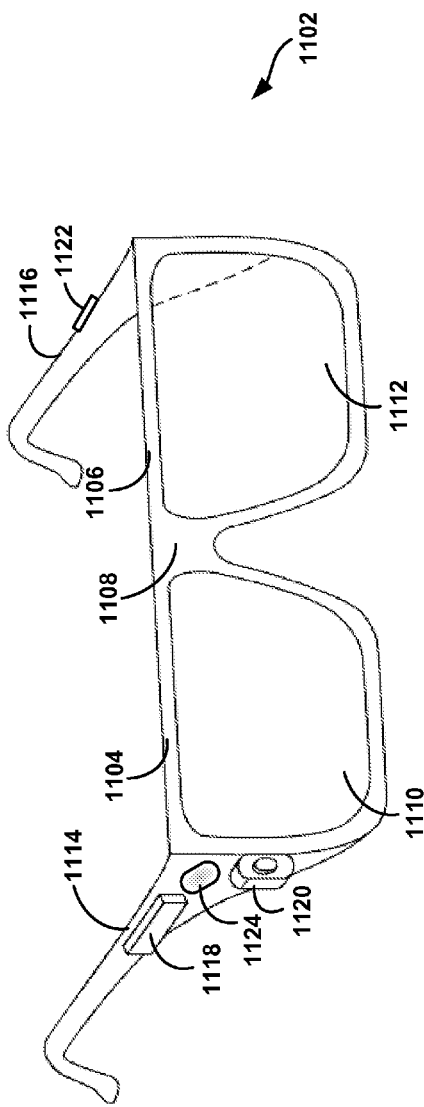
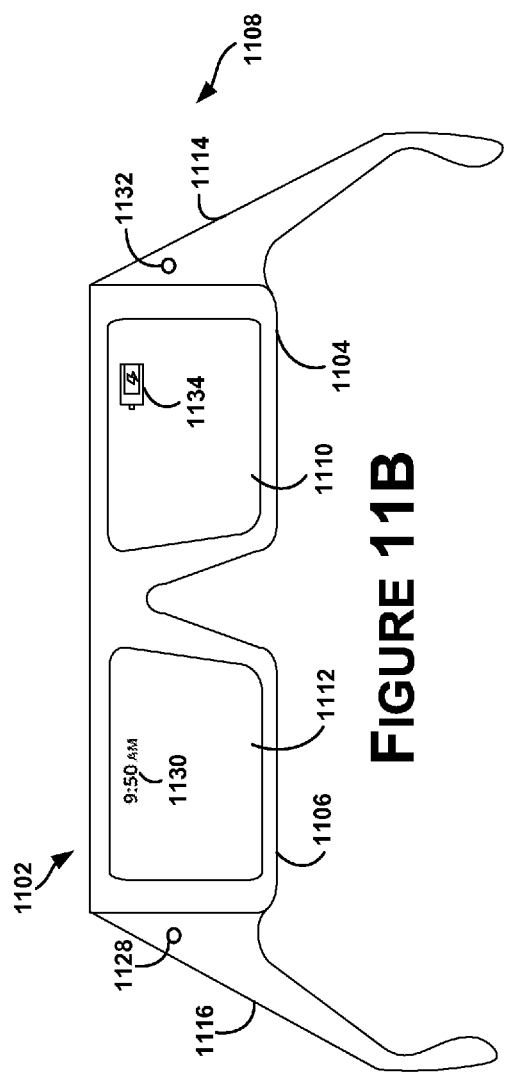
FIGURE 11A
FIGURE 11B

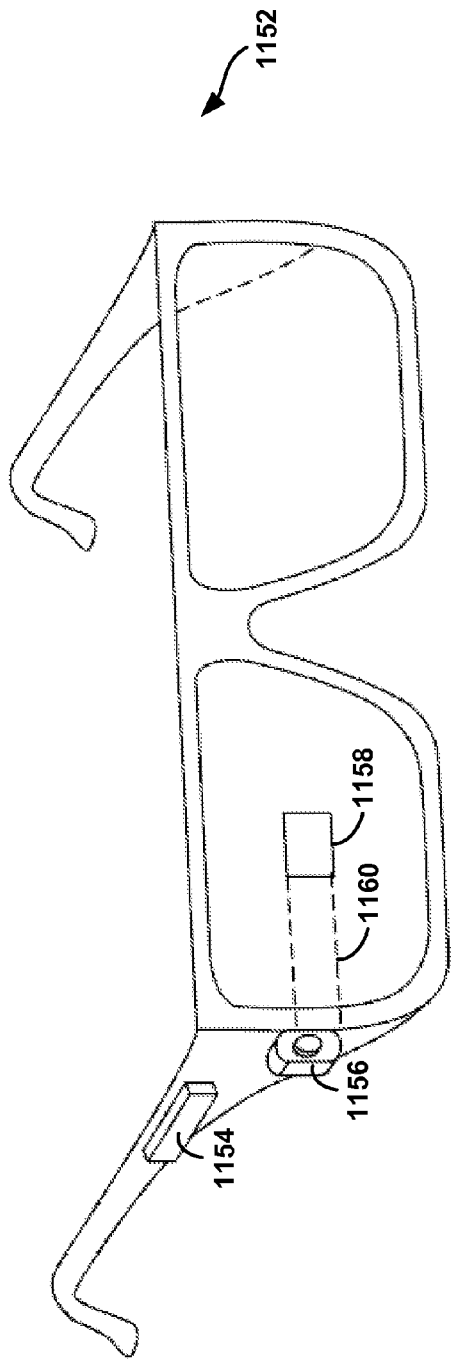
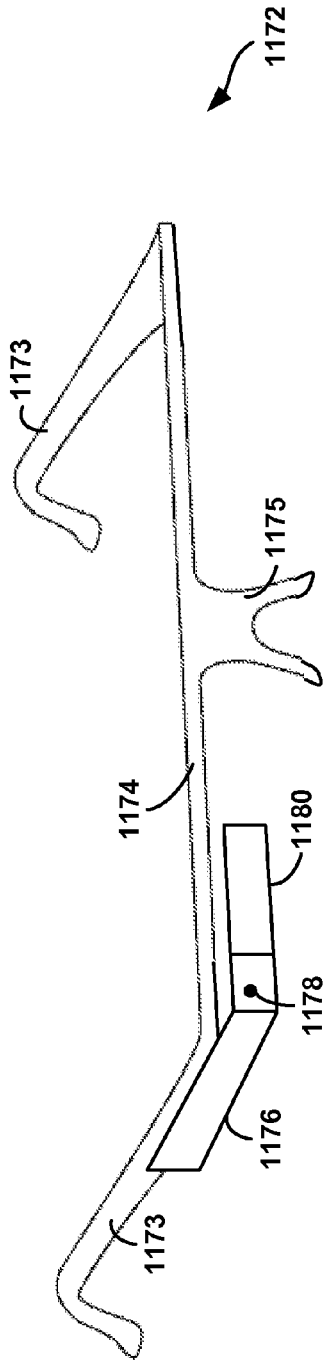

METHODS AND SYSTEMS CONFIGURED FOR PROCESSING VIDEO FRAMES INTO ANIMATION

BACKGROUND

Unless otherwise indicated herein, the materials described in this section are not prior art to the claims in this application and are not admitted to be prior art by inclusion in this section.

Many video editing applications exist today offering for ability to customize animations of video to create interesting effects. Often, video editing applications require manual interaction and editing by an artist to create the effects. Example video editing includes editing segments of motion video footage to remove or add images, providing special effects such as digital additions to the video, and providing other or additional sound recordings in a post-production process.

SUMMARY

In one example, a method is provided that includes receiving a video including a plurality of frames, and the video has a first animation. The method also includes determining an amount of change per pixel across a portion of the plurality of frames, and based on the amount of change per pixel, generating a first masking frame indicative of modifiable pixels and a second masking frame indicative of static background pixels. The method also includes applying the first masking frame to frames of the plurality of frames to generate a plurality of partial frames, and applying the second masking frame to a given frame to generate a background template frame. The method also includes combining the background template frame with each of the plurality of partial frames to generate a plurality of altered frames, and processing the plurality of altered frames into a second animation.

In another example, a computer-readable medium having stored therein instructions, that when executed by a computing device, cause the computing device to perform functions is provided. The functions may comprise receiving a video including a plurality of frames, and the video has a first animation. The functions may also comprise determining an amount of change per pixel across a portion of the plurality of frames, and based on the amount of change per pixel, generating a first masking frame indicative of modifiable pixels and a second masking frame indicative of static background pixels. The functions further comprise applying the first masking frame to frames of the plurality of frames to generate a plurality of partial frames, and applying the second masking frame to a given frame to generate a background template frame. The functions also comprise combining the background template frame with each of the plurality of partial frames to generate a plurality of altered frames, and processing the plurality of altered frames into a second animation.

In a further example, a system is provided that comprises at least one processor, and data storage having stored therein instructions executable by the processor to perform functions. The functions comprise receiving a video including a plurality of frames, and the video has a first animation. The functions also comprise determining an amount of change per pixel across a portion of the plurality of frames, and based on the amount of change per pixel, generating a first masking frame indicative of modifiable pixels and a second masking frame indicative of static background pixels. The functions also comprise applying the first masking frame to frames of the plurality of frames to generate a plurality of partial frames, and applying the second masking frame to a given frame to generate a background template frame. The functions further comprise combining the background template frame with each of the plurality of partial frames to generate a plurality of altered frames, and processing the plurality of altered frames into a second animation.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 4A-4C, 5A-5C and 6A-6C illustrate an example sequence of video frames that are processed according to examples described herein.

FIGS. 7A-7C, 8 and 9A-9C illustrate processing frames of an example in which video illustrates a beach scene including an ocean with moving waves in a background, and a sea crab walking across the beach.

FIGS. 11A-11D illustrate one example of the computing device taking the form of a wearable computing system.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

The disclosure generally describes, among other items, examples for using frames from a video and removing selected movement from portions of scenes to create interesting effects. In one example, a video may be received in which portions of a scene may not be moving or may only be moving slightly. Frames of the video may be aligned to remove movements of a camera that captured the video. Frames can be compared to each other to determine an amount of change per pixel across a portion of the plurality of frames. Based on the amount of change per pixel, a first masking frame indicative of modifiable pixels may be generated. For example, a mask that assigns a value to each pixel quantifying the amount of change across all frames is generated. Example values include assigning the value of the variance of the corresponding pixel across all frames. The variance calculation may depend on a choice of color distance metric to use to describe the pixel, and one example includes a Euclidean color metric. The modifiable pixels may indicate those pixels to be carried forward in the animation.

In additional examples, a second masking frame indicative of static background pixels can also be generated. The first masking frame can be applied to all frames of the plurality of frames to generate a plurality of partial frames, and the second masking frame can be applied to a given frame to generate a background template frame. The background template frame can be combined with each of the plurality of partial frames to generate a plurality of altered frames, and the plurality of altered frames can be processed into a second animation.

In some examples, the background template frame can be chosen to represent non-moving parts of the scene/video. This may be arbitrarily selected, or may be determined based on an average of a few frames. Then, to generate the altered frames, for each frame and for each pixel with a low mask value, the pixel can be replaced with the value of the background template frame. For each pixel with a high mask value, the original pixel value can be used.

Figure 1:
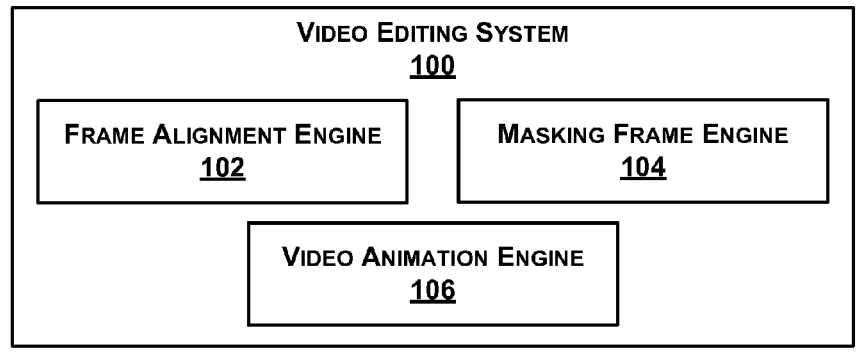
FIG. 1 illustrates a block diagram of an example video editing system.

Referring now to FIG. 1, a block diagram of a video editing system 100 is illustrated. The video editing system 100 includes a frame alignment engine 102, a masking frame engine 104, and a video animation engine 106. The video editing system 100 may be configured to receive a video, and to perform video editing processes on the video. For example, the frame alignment engine 102 may estimate a path of a camera that recorded the video based on motion of objects within the received video to align frames within the video. The masking frame engine 104 may then determine masking frames to generate a background frame template and customizable frame templates, and the video animation engine 106 may recast the received video according to animation based on modifications of the frames by the masking frame engine 104.

One or more of the described functions or components of the system 100 may be divided up into additional functional or physical components, or combined into fewer functional or physical components. In some further examples, additional functional and/or physical components may be added to the examples illustrated by FIG. 1. Still further, any of the frame alignment engine 102, the masking frame engine 104, and/or the video animation engine 106 may include or be provided in the form of a processor (e.g., a micro processor, a digital signal processor (DSP), etc.) configured to execute program code including one or more instructions for implementing logical functions described herein. The system 100 may further include any type of computer readable medium (non-transitory medium), for example, such as a storage device including a disk or hard drive, to store the program code. In other examples, the camera path translation system 100 may be included within other systems.

Figure 2:
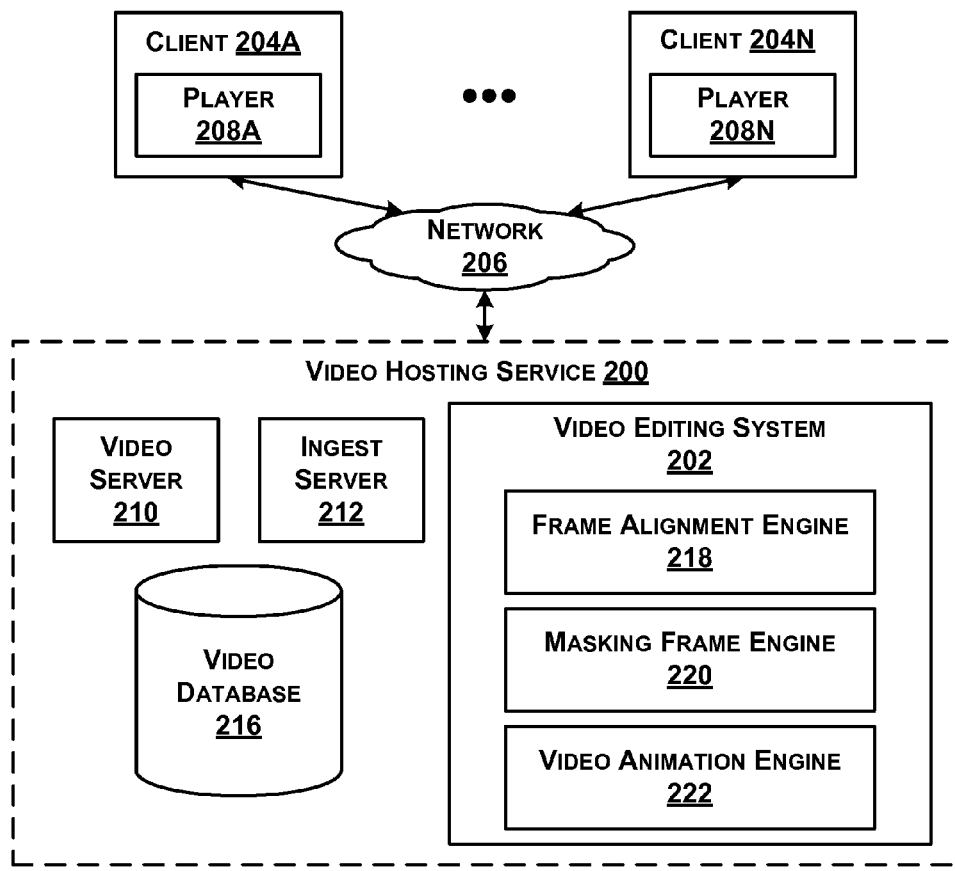
FIG. 2 is a block diagram illustrating a system view of an example video hosting service that includes a video editing system.

FIG. 2 is a block diagram illustrating a system view of a video hosting service 200 that includes a video editing system 202. Multiple users/viewers may use clients 204A-N to send video hosting requests to the video hosting service 200, such as to upload videos to a video hosting website, and to receive the requested services from the video hosting service 200. The video hosting service 200 may be configured to communicate with the one or more clients 204A-N via a network 206. The video hosting service 200 may receive the video hosting service requests from the clients 204A-N over wired or wireless connections.

Turning to the individual entities illustrated on FIG. 2, each client 204A-N may be used by a user to request video hosting services. For example, a user can use the client 204A to send a request for uploading a video for sharing, or playing a video. The clients 204A-N can be any type of computer device, such as a personal computer (e.g., desktop, notebook, tablet, laptop) computer, as well as devices such as a mobile telephone, personal digital assistant, or IP enabled video player. The clients 204A-N may include a processor, a display device (or output to a display device), and a local storage, such as a hard drive or flash memory device to which the clients 204A-N store data used by the user in performing tasks, and a network interface for coupling to the video hosting service 200 via the network 206.

The clients 204A-N may include a video player 208A-N for playing a video stream. The video player 208A-N may be a standalone application, or a plug-in to another application such as a network or Internet browser. Where the client 204A-N is a general purpose device (e.g., a desktop computer, mobile phone), the player 208A-N may be implemented as software executed by the computer. Where the client 204A-N is a dedicated device (e.g., a dedicated video player), the player 208A-N may be implemented in hardware, or a combination of hardware and software. The player 208A-N may include user interface controls (and corresponding application programming interfaces) for selecting a video feed, starting, stopping, and rewinding a video feed. Also, the player 208A-N can include in a user interface a video display format selection configured to indicate a video display format (e.g., a standard definition TV or a high-definition TV). Other types of user interface controls (e.g., buttons, keyboard controls) can be used as well to control the playback and video format selection functionality of the player 208A-N.

The network 206 enables communications between the clients 204A-N and the video hosting service 200. In one embodiment, the network 206 is the Internet, and uses standardized internetworking communications technologies and protocols, known now or subsequently developed that enable the clients 204A-N to communicate with the video hosting service 200. In another embodiment, the network 206 may be a wireless cellular network that enables wireless communication between the clients 204A-N and the video hosting service 200.

The video hosting service 200 comprises the video editing system 202, a video server 210, an ingest server 212, and a video database 216. The video server 210 may be configured to serve videos from the video database 216 in response to user video hosting service requests. The ingest server 212 may be configured to receive user uploaded videos and store the videos in the video database 216. The video database 216 may be configured to store user uploaded videos and videos processed by the camera path translation system 202. In one embodiment, the video database 216 stores a large video corpus.

The video editing system 202 may include a frame alignment engine 218, a masking frame engine 220, and a video animation engine 222. The video editing system 202 may be configured to receive user uploaded videos from the ingest server 212, and to perform editing of the videos based on instructions received from users, from other devices, or based on programmed instructions.

In one example, the video editing system 202 may process videos to provide altered videos that have a limited or partial movement as compared to original received videos. Regions of frames of videos (e.g., selected pixels or modifiable pixels) may be determined and content within the regions may be maintained. A remaining portion of frames of the video may be removed and replaced with background content. In such examples, a resulting video of altered frames may illustrate partial movement as compared to the originally received video.

Figure 3:
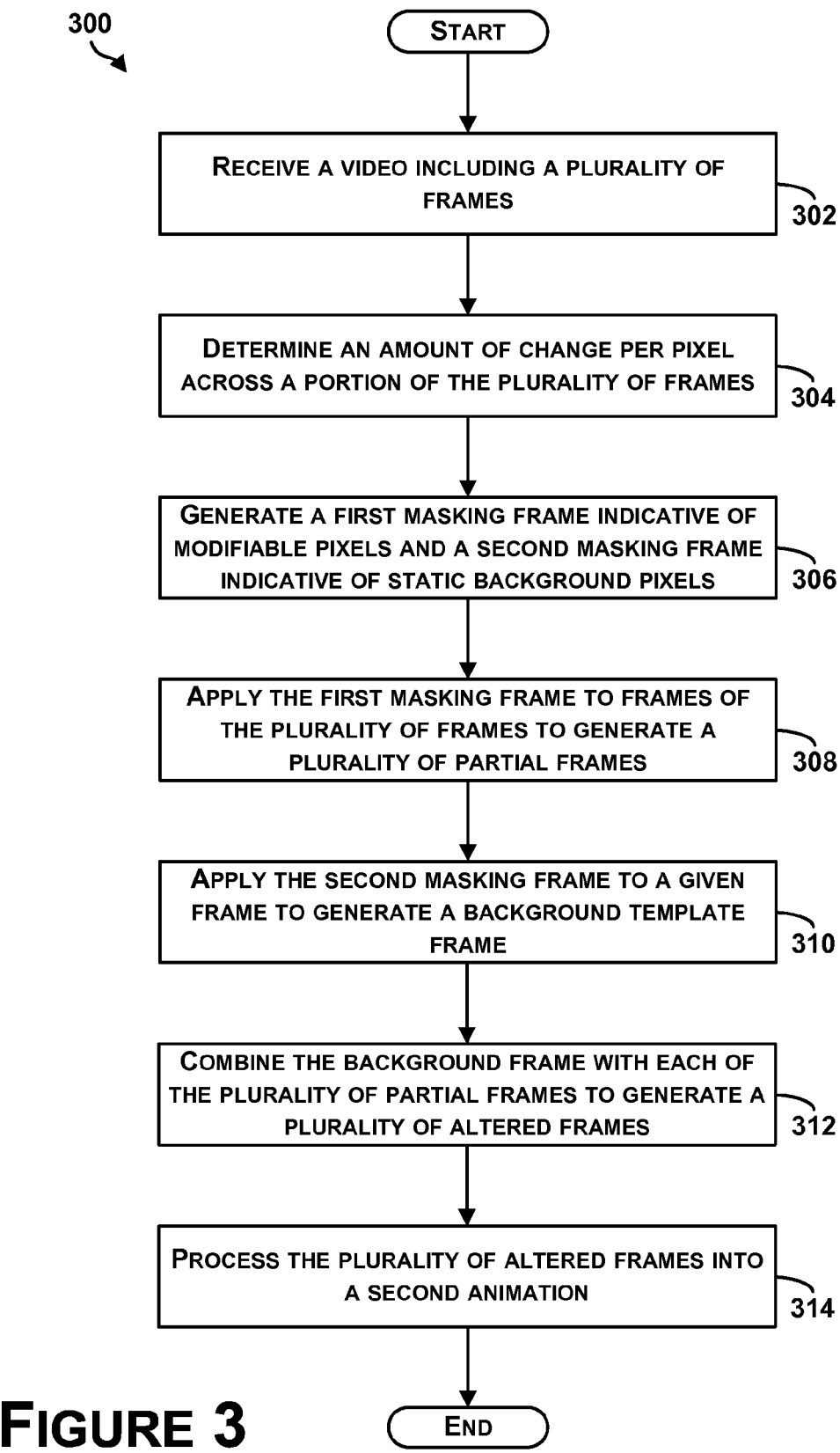
FIG. 3 is an example block diagram of a method to process a video, in accordance with at least some embodiments described herein.

FIG. 3 is an example block diagram of a method to process a video, in accordance with at least some embodiments described herein. Method 300 shown in FIG. 3 presents an embodiment of a method that, for example, could be used with the systems 100 and 200, for example, and may be performed by a device, a server, or a combination of the device and the server, or any components of the systems 100 and 200. Method 300 may include one or more operations, functions, or actions as illustrated by one or more of blocks 302-314. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 includes receiving a video including a plurality of frames. The video may be received by any computing device, and in some examples, the video may be received by a device configure to capture the video. In other instances, the video may be captured by a camera and provided to another computing device.

As one example, a video may be captured by a mobile phone that includes a camera, and may have a given animation. Within the video, parts of a scene may not be moving or may be moving slightly compared to other parts or objects in the scene. One example of this may include a beach scene in which waves are moving across the water, and a sea crab is walking across the beach. Other parts of the scene include the sky or trees may not be moving. Movement of portions of the scene may be interpreted due to pixels changing which includes lighting changes as well as movement of an object.

At block 304, the method 300 includes determining an amount of change per pixel across a portion of the plurality of frames. As an example, pixels may be compared to determine movement across the pixels, and movement may be determined due to change across the pixels. Pixels within one frame of the video may be compared to corresponding pixels of a subsequent frame to identify changes per pixel.

In one example, pixels may be assigned values, and a difference in values of corresponding pixels from frame to frame can be determined to identify where a difference is largest. A largest amount of difference between pixels of corresponding frames may indicate where within the frame a largest amount of movement may be found.

Any type of value may be assigned to a pixel, and the value may be used to describe content of the pixel. In one example, pixel values may include color metric values, and an amount of change per pixel value may be determined based on Euclidean distances between color metric values.

In other examples, a pixel value may include information indicating how bright that pixel is to be displayed, and/or what color the pixel should display. In some examples, a pixel value may be a 1-bit number indicating either foreground or background. In other examples, such as for a grayscale image, a pixel value may be a number that represents a brightness of the pixel. Still further, a pixel value may be an 8-bit integer giving a range of possible values from 0 to 255, where zero may be considered to be black and 255 may be considered to be white along the color scale so that values in between comprise different shades of gray. To represent color images, separate red, green and blue components may be specified for each pixel, and so the pixel value may be a vector of three numbers. In yet further examples, actual grayscale or color component intensities for each pixel may not actually be stored explicitly, and what is stored for each pixel can be an index to a color map in which actual intensity or colors can be looked up.

In another example, an amount of change per pixel across the portion of the plurality of frames may be determined based on a variance of a pixel value across the portion of the plurality of frames of a corresponding pixel. Variance between color values of a pixel across frames can be determined and characterized as an amount of change per pixel. A mathematical variance between color values of pixels across frames is one way to determine an amount of change, and any of the example methods described herein may be used instead or in combination to determine or characterize an amount of change per pixel.

In some examples, prior to determining an amount of change per pixel across frames, frames of the video may be aligned. For example, frames may be temporally aligned, or in some examples aligned based on a time of recording. Frames may also be aligned based on spatial aspects of content of the frame, such as location of pixel content. Many methods exist for alignment of video frames, and one of ordinary skill in the art will appreciate that any of known methods may be used for frame alignment.

At block 306, the method 300 includes generating a first masking frame indicative of modifiable pixels and a second masking frame indicative of static background pixels. For example, based on the amount of change per pixel, a map may be generated indicating where frames include movement, and pixels in the map may be characterized to indicate an amount of movement per pixel. For pixels that are characterized as having movement above a threshold (e.g., referring to the beach scene, pixels including the sea crab walking across the scene may be determined to have movement above a threshold), those pixels may be classified as modifiable pixels. A first masking frame may classify pixels as modifiable pixels so as to indicate content from pixels to be included within a resulting video. Other pixels in the first masking frame not classified as modifiable pixels may be set to null.

For remaining pixels that do not have movement characterized as being above a threshold amount, those pixels may be classified as static background pixels within a second masking frame. Other pixels in the second masking frame not classified as static background pixels may be set to unity. Thus, in some examples, pixel values per pixel may be compared to a threshold, and based on the comparison, the first masking frame and the second masking frame may be generated. Information indicative of the threshold may be received from a user input, and a value of the threshold may characterize a number of pixels to include as the modifiable pixels.

In some examples, pixel values of modifiable pixels of the first masking frame may be set to one and pixel values of the static background pixels of the second masking frame may be set to zero. Thus, the second masking frame may be an inverse of the first masking frame.

In some examples, the method 300 may also include receiving a selection of one or more pixels to include as the modifiable pixels or a selection of one or more pixels to include as the static background pixels. Thus, a user may preset portions of frames as background or moving objects.

At block 308, the method 300 includes applying the first masking frame to frames of the plurality of frames to generate a plurality of partial frames. At block 310, the method 300 includes applying the second masking frame to a given frame to generate a background template frame. To apply the masking frames to frames of the video, the masking frames may be multiplied by the frames of the video.

The first masking frame may be multiplied by each frame of the video to identify pixels to use from the frames of the video that identify moving parts of the image, for example. And because the second masking frame indicates background static pixels, the second masking frame may be multiplied by a frame of the video to identify pixels of the frame to be used as background.

Any frame may be chosen to be applied to the second masking frame to generate the background template frame. In one instance, a selection of the given frame from the plurality of frames to use to generate the background template frame may be received or may be arbitrary. In another example, an average of a few frames may be used to generate a background template frame. For instance, the second masking frame may be applied to a number of frames and a resulting average of the number of frames may be used as the background template frame.

In one example, applying the first masking frame to frames of the plurality of frames to generate a plurality of partial frames includes for each frame of the plurality of frames using the value of the pixel as a given value for the modifiable pixels indicated by the first masking frame to generate a given partial frame. As mentioned, values of the modifiable pixels in the first masking frame may be set to one, and thus, application (e.g., multiplication) of the first masking frame by the other frames results in content of the pixels corresponding to the modifiable pixels in the frames passing to the partial frames.

At block 312, the method 300 includes combining the background template frame with each of the plurality of partial frames to generate a plurality of altered frames. In one example, the frames may be combined by adding content of the frames to each other.

In addition, combining the background template frame with each of the plurality of partial frames to generate a plurality of altered frames includes for the altered frames replacing the value of pixels with a corresponding pixel value of the background template frame for the static background pixels indicated by the second masking frame.

At block 314, the method 300 includes processing the plurality of altered frames into a second animation. In one example, the second animation illustrates movement across the plurality of altered frames only within pixels characterized by the modifiable pixels of the first masking frame. In other examples, the second animation illustrates background movement as indicated by the background template frame, and other movement as indicated by the altered frames.

In some examples, the method 300 may be performed to compare frames of a video and create a mask that assigns a value to each pixel of a given frame so as to quantify an amount of change across frames. A user may have an option to modify the mask, for example, by indicating areas for static pixels and areas for modifiable pixels.

In some examples, the method 300 may be performed by a server. A video may be uploaded to the server, and the server may edit the video to provide a subsequent video with partial animation.

FIGS. 4-6 illustrate an example sequence of video frames that are processed according to examples described herein. Each of FIGS. 4A-4C, FIGS. 5A-5C, and FIGS. 6A-6C illustrate example frames of 6×6 pixels.

FIGS. 4A-4C illustrate frames F1, F2, and F3. Pixels of each of these frames are shaded, and shading represents various items within each frame such as a varying level of movement or lighting in the pixels. A given pixel in each frame is marked "A" representing a pixel that includes content representative of movement, lighting, or non-stationary content. As seen, a location of a pixel including the "A" changes from frame F1 to F2 to F3 (e.g., over a sequence of the frames). Frames F1 through F3 may be a sequence of frames over time.

FIGS. 5A-5C illustrate three masking frames identified as M1, M2, and M3. FIG. 5A illustrates masking frame M1, which in this example, includes values for each pixel assigned or calculated as a value of a variance of a corresponding pixel across all frames of a portion of frames of a video (e.g., across frames F1 through F3). A variance calculation may depend on a choice of a color distance metric used to characterize differences between pixels across frames.

In one example for pixel P1, a Euclidean color metric may be used. Taking example values of P1 for each frame to be: $P1(F1)=(1, 1, 0)$, $P1(F2)=(1, 0, 0)$, and $P1(F3)=(1, 1, 0)$, then a mean of P1 across frames may be calculated as follows:

$$\tfrac{1}{3}*((1,1,0)+(1,0,0)+(1,1,0))=(1,\tfrac{2}{3},0)$$

A variance of P1 for each of frames F1, F2, and F3 may then be calculated as follows:

$$\text{var } F1=\tfrac{1}{3}[(1-1)^2+(1-\tfrac{2}{3})^2+(0-0)^2]=\tfrac{1}{27}$$

$$\text{var } F2=\tfrac{1}{3}[(1-1)^2+(0-\tfrac{2}{3})^2+(0-0)^2]=\tfrac{4}{27}$$

$$\text{var } F3=\tfrac{1}{3}[(1-1)^2+(1-\tfrac{2}{3})^2+(0-0)^2]=\tfrac{1}{27}$$

A resulting variance of P1 across frames F1 through F3 may then be calculated as follows:

$$\text{var } F1+\text{var } F2+\text{var } F3=6/27=0.2222$$

Thus, the pixel value assigned to pixel P1 may be 0.22, or the pixel value determined as a result of a change in content of data for a pixel location at P1 may be 0.22 as shown in FIG. 5A. A variance may be calculated across any number of frames and used as a pixel value, for example.

In one example, FIG. 5A illustrates masking M1 with such variance values for each pixel, and pixel values for pixel P1 are shown to be 0.22, and other example pixel values are shown as well.

FIG. 5B illustrates a second masking frame M2, which may be considered a masking frame that indicates modifiable pixels. To identify modifiable pixels, a threshold can be applied to the masking frame M1, and those pixels that have values above the threshold may be selected as modifiable pixels and indicated as such with a value of "1" in masking frame M2. In the example shown in FIG. 5B, the threshold is 0.2, and thus, the pixels that have values above 0.2 are set to a value of "1" in masking frame M2, and the pixels that have values lower than 0.2 are set to a value of "0" in masking frame M2.

A value of the threshold may be preset, received from a user selection, or determined based on a histogram analysis or variance minimization of all values of pixels, for example.

FIG. 5C is another masking frame M3, which is includes values for pixels that are the inverse of values of pixels for M2. For example, masking frames M2 and M3 have values for pixels of "1" or "0", and thus, M3 is an inverse of M2. The masking frame M3 thus identifies pixels indicative of static background pixels.

As seen in FIGS. 5A-5C, values of pixels in masking frames M2 and M3 are based on the amount of change per pixel across frames F1 to F3. For example, those pixels that have values above a threshold are set to a unity value in masking frame M2 and a null value in masking frame M3. Masking frame M2 may be considered an action masking frame since pixel locations are identified as unity value for those identified as including movement or lighting changes. Masking frame M3 may be considered a background masking frame since pixels locations are identified as null for those identified as including movement or lighting changes.

FIGS. 6A-6C illustrate resulting frames F1', F2', and F3' that are a blended result of original frames F1, F2, and F3, and a background frames. In the example shown in FIGS. 4-6, Frame F1 was chosen as a fixed background frame, and thus, background masking frame M3 is applied to F1 to generate the background frame. For example, the background masking frame M3 can be applied to frame F1 by multiplying M3 by F1 (F1×M3), which results in content from frame F1 at pixel locations identified by "1" in M3 to be maintained and content in Frame F1 at pixel locations identified by "0" in M3 to be removed and left empty.

Content in the empty pixel locations is replaced by respective content for frames F1, F2, and F3 by applying the masking frame M2 to frames F1, F2, and F3 to generate partial frames (F1×M2), (F2×M2) and (F3×M2), and the partial frames are combined with the background template frame to generate altered resulting frames F1', F2', and F3' as follows:

$$F1'=(F1 \times M2)+(F1 \times M3)$$

$$F2'=(F2 \times M2)+(F1 \times M3)$$

$$F3'=(F3 \times M2)+(F1 \times M3)$$

Thus, as shown in FIGS. 6A-6C, altered resulting frames F1', F2', and F3' include content of the background frame at pixel locations identified as unity in masking frame M3 and content from the respective original frame at pixels identified as unity in masking frame M2 (e.g., modifiable pixel locations). This preserves content identified as moving across the frame sequence of frames, for example.

Subsequently, each of altered resulting frames F1', F2', and F3' may be processed into an animation by recombining the frames into a video. The video may illustrate partial motion, movement, lighting changes, or other changes per pixel as compared to the original video. Using the example methods described herein, selected movement in a video may be highlighted and maintained across frames, while other movement (e.g., movement of a lower amount) may be removed. As shown from FIGS. 6A-6C, content in pixels of the second and third rows and second and third columns of the 6×6 frame changes from frame F1' to F2' to F3', and content within all remaining pixels remains constant. An amount of pixels within which content may change can be determined based on a value of the threshold of masking frame M1, for example.

FIGS. 7-9 illustrate processing frames of an example in which video illustrates a beach scene including an ocean with moving waves in a background, and a sea crab walking across the beach. FIGS. 7A-7C illustrate three consecutive frames of the video in which the waves are moving, the crab is moving across the beach, and the tree and beach are stationary. In this example, movement of the waves may be removed to only illustrate movement of the sea crab. In another example, however, to illustrate an alternate effect, movement of the sea crab may be removed while movement of the waves may remain. In such an example, a threshold comparison of values of pixels to use for generating the masking frames may be performed to identify values of pixels below the threshold, for example, to identify low movement or changes per pixel.

FIG. 8 illustrates an example background mask that is created upon performing the threshold comparison of values of pixels and applying the mask to a selected frame (e.g., frame F1). FIGS. 9A-9C illustrate the modified frames without background to show content of frames F1-F3 that is selected for movement. In this example, the pixels including the crab were determined to satisfy the threshold value, and result based on application of a second mask M2 (not shown). Each of the frames F1', F2', and F3' can be combined with the background frame (shown in FIG. 8) to generated the altered frames for processing of a modified video, for example.

Example methods described herein may be performed in any manner to select, highlight, or maintain portions of video and effectively remove any movement or changes in the video of other portions.

Figure 10:
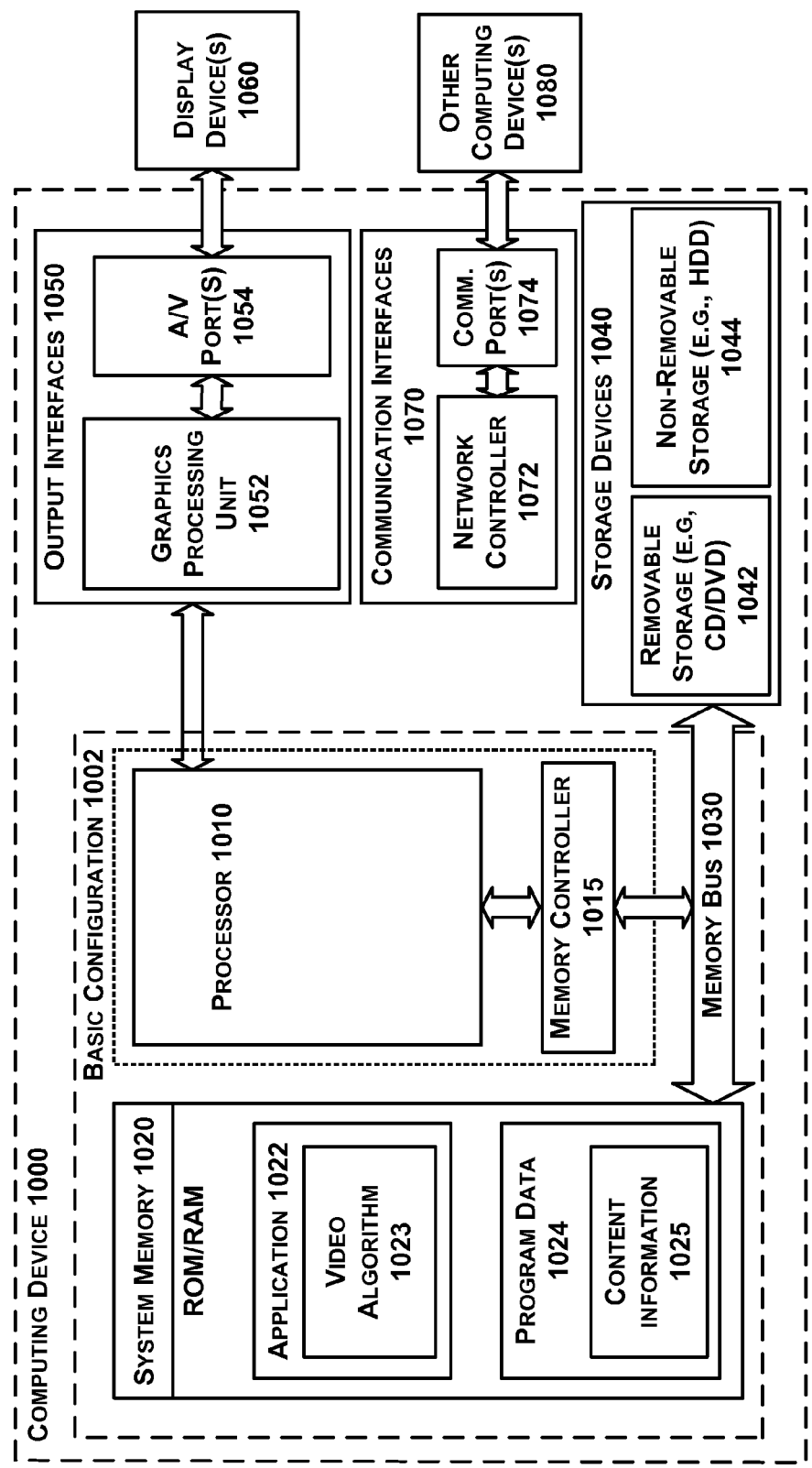
FIG. 10 is a functional block diagram illustrating an example computing device used in a computing system that is arranged in accordance with at least some embodiments described herein.

FIG. 10 is a functional block diagram illustrating an example computing device 1000 used in a computing system that is arranged in accordance with at least some embodiments described herein. The computing device may be a personal computer, mobile device, cellular phone, video game system, or global positioning system, and may be implemented as a client device, a server, a system, a combination thereof, or as a portion of components described in FIGS. 1-2. In a basic configuration 1002, computing device 1000 may include one or more processors 1010 and system memory 1020. A memory bus 1030 can be used for communicating between the processor 1010 and the system memory 1020. Depending on the desired configuration, processor 1010 can be of any type including but not limited to a microprocessor (µg), a microcontroller (µC), a digital signal processor (DSP), or any combination thereof. A memory controller 1015 can also be used with the processor 1010, or in some implementations, the memory controller 1015 can be an internal part of the processor 1010.

Depending on the desired configuration, the system memory 1020 can be of any type including but not limited to volatile memory (such as RAM), non-volatile memory (such as ROM, flash memory, etc.) or any combination thereof. System memory 10720 may include one or more applications 1022, and program data 1024. Application 1022 may include a video algorithm 1023 that is arranged to provide inputs to the electronic circuits, in accordance with the present disclosure. Program Data 1024 may include video content information 1025 that could be directed to any number of types of data. In some example embodiments, application 1022 can be arranged to operate with program data 1024 on an operating system.

Computing device 1000 can have additional features or functionality, and additional interfaces to facilitate communications between the basic configuration 1002 and any devices and interfaces. For example, data storage devices 1040 can be provided including removable storage devices 1042, non-removable storage devices 1044, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 1020 and storage devices 1040 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media can be part of device 1000.

Computing device 1000 can also include output interfaces 1050 that may include a graphics processing unit 1052, which can be configured to communicate to various external devices such as display devices 1060 or speakers via one or more A/V ports 1054 or a communication interface 1070. The communication interface 1070 may include a network controller 1072, which can be arranged to facilitate communications with one or more other computing devices 1080 over a network communication via one or more communication ports 1074. The communication connection is one example of a communication media. Communication media may be embodied by computer readable instructions, data structures, program modules, and includes any information delivery media. By way of example, and not limitation, communication media can include wired media such as a wired network or direct-wired connection, and wireless media such as acoustic, radio frequency (RF), infrared (IR) and other wireless media.

Computing device 1000 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 can also be implemented as a personal computer including both laptop computer and non-laptop computer configurations.

FIGS. 11A-11D illustrate one example of the computing device taking the form of a wearable computing system. The wearable computing device illustrated in FIG. 11A may be used to carry out the methods and functions described herein, and in one example, may include components as described in FIG. 1. In FIG. 11A, the wearable computing system takes the form of a head-mounted display (HMD) 1102 (which may also be referred to as a head-mounted device). It should be understood, however, that exemplary systems and devices may take the form of or be implemented within or in association with other types of devices, without departing from the scope of the disclosure. As illustrated in FIG. 11A, the head-mounted device 1102 comprises frame elements including lens-frames 1104, 1106 and a center frame support 1108, lens elements 1110, 1112, and extending side-arms 1114, 1116. The center frame support 1108 and the extending side-arms 1114, 1116 are configured to secure the head-mounted device 1102 to the face of a user via a nose and ears of a user, respectively.

Each of the frame elements 1104, 1106, and 1108 and the extending side-arms 1114, 1116 may be formed of a solid structure of plastic and/or metal, or may be formed of a hollow structure of similar material so as to allow wiring and component interconnects to be internally routed through the head-mounted device 1102. Other materials may be possible as well.

One or more of each of the lens elements 1110, 1112 may be formed of any material that can suitably display a projected image or graphic. Each of the lens elements 1110, 1112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 1114, 1116 may each be projections that extend away from the lens-frames 1104, 1106, respectively, and may be positioned behind ears of a user to secure the head-mounted device 1102 to the user. The extending side-arms 1114, 1116 may further secure the head-mounted device 1102 to the user by extending around a rear portion of the head of the user. Additionally or alternatively, for example, the HMD 1102 may connect to or be affixed within a head-mounted helmet structure. Other possibilities exist as well.

The HMD 1102 may also include an on-board computing system 1118, a video camera 1120, a sensor 1122, and a finger-operable touch pad 1124. The on-board computing system 1118 is shown to be positioned on the extending side-arm 1114 of the head-mounted device 1102; however, the on-board computing system 1118 may be provided on other parts of the head-mounted device 1102 or may be positioned remote from the head-mounted device 1102 (e.g., the on-board computing system 1118 could be wire- or wirelessly-connected to the head-mounted device 1102). The on-board computing system 1118 may include a processor and memory, for example. The on-board computing system 1118 may be configured to receive and analyze data from the video camera 1120 and the finger-operable touch pad 1124 (and possibly from other sensory devices, user interfaces, or both) and generate images for output by the lens elements 1110 and 1112.

The video camera 1120 is shown positioned on the extending side-arm 1114 of the head-mounted device 1102; however, the video camera 1120 may be provided on other parts of the head-mounted device 1102. The video camera 1120 may be configured to capture images at various resolutions or at different frame rates. Many video cameras with a small form-factor, such as those used in cell phones or webcams, for example, may be incorporated into an example of the HMD 1102.

Further, although FIG. 11A illustrates one video camera 1120, more video cameras may be used, and each may be configured to capture the same view, or to capture different views. For example, the video camera 1120 may be forward facing to capture at least a portion of the real-world view perceived by the user. This forward facing image captured by the video camera 1120 may then be used to generate an augmented reality where computer generated images appear to interact with the real-world view perceived by the user.

The sensor 1122 is shown on the extending side-arm 1116 of the head-mounted device 1102; however, the sensor 1122 may be positioned on other parts of the head-mounted device 1102. The sensor 1122 may include one or more of a gyroscope or an accelerometer, for example. Other sensing devices may be included within, or in addition to, the sensor 1122 or other sensing functions may be performed by the sensor 1122.

The finger-operable touch pad 1124 is shown on the extending side-arm 1114 of the head-mounted device 1102. However, the finger-operable touch pad 1124 may be positioned on other parts of the head-mounted device 1102. Also, more than one finger-operable touch pad may be present on the head-mounted device 1102. The finger-operable touch pad 1124 may be used by a user to input commands. The finger-operable touch pad 1124 may sense at least one of a position and a movement of a finger via capacitive sensing, resistance sensing, or a surface acoustic wave process, among other possibilities. The finger-operable touch pad 1124 may be capable of sensing finger movement in a direction parallel or planar to the pad surface, in a direction normal to the pad surface, or both, and may also be capable of sensing a level of pressure applied to the pad surface. The finger-operable touch pad 1124 may be formed of one or more translucent or transparent insulating layers and one or more translucent or transparent conducting layers. Edges of the finger-operable touch pad 1124 may be formed to have a raised, indented, or roughened surface, so as to provide tactile feedback to a user when the finger of a user reaches the edge, or other area, of the finger-operable touch pad 1124. If more than one finger-operable touch pad is present, each finger-operable touch pad may be operated independently, and may provide a different function.

FIG. 11B illustrates an alternate view of the wearable computing device illustrated in FIG. 11A. As shown in FIG. 11B, the lens elements 1110, 1112 may act as display elements. The head-mounted device 1102 may include a first projector 1128 coupled to an inside surface of the extending side-arm 1116 and configured to project a display 1130 onto an inside surface of the lens element 1112. Additionally or alternatively, a second projector 1132 may be coupled to an inside surface of the extending side-arm 1114 and configured to project a display 1134 onto an inside surface of the lens element 1110.

The lens elements 1110, 1112 may act as a combiner in a light projection system and may include a coating that reflects the light projected onto them from the projectors 1128, 1132. In some embodiments, a reflective coating may not be used (e.g., when the projectors 1128, 1132 are scanning laser devices).

In alternative embodiments, other types of display elements may also be used. For example, the lens elements 1110, 1112 themselves may include: a transparent or semi-transparent matrix display, such as an electroluminescent display or a liquid crystal display, one or more waveguides for delivering an image to the eyes of the user, or other optical elements capable of delivering an in focus near-to-eye image to the user. A corresponding display driver may be disposed within the frame elements 1104, 1106 for driving such a matrix display. Alternatively or additionally, a laser or LED source and scanning system could be used to draw a raster display directly onto the retina of one or more eyes of the user. Other possibilities exist as well.

FIG. 11C illustrates another wearable computing system according to an exemplary embodiment, which takes the form of an HMD 1152. The HMD 1152 may include frame elements and side-arms such as those described with respect to FIGS. 11A and 11B. The HMD 1152 may additionally include an on-board computing system 1154 and a video camera 1156, such as those described with respect to FIGS. 11A and 11B. The video camera 1156 is shown mounted on a frame of the HMD 1152. However, the video camera 1156 may be mounted at other positions as well.

As shown in FIG. 11C, the HMD 1152 may include a single display 1158 which may be coupled to the device. The display 1158 may be formed on one of the lens elements of the HMD 1152, such as a lens element described with respect to FIGS. 11A and 11B, and may be configured to overlay computer-generated graphics in the physical-world view of the user. The display 1158 is shown to be provided in a center of a lens of the HMD 1152, however, the display 1158 may be provided in other positions. The display 1158 is controllable via the computing system 1154 that is coupled to the display 1158 via an optical waveguide 1160.

FIG. 11D illustrates another wearable computing system according to an exemplary embodiment, which takes the form of an HMD 1172. The HMD 1172 may include side-arms 1173, a center frame support 1174, and a bridge portion with nosepiece 1172. In the example shown in FIG. 11D, the center frame support 1174 connects the side-arms 1173. The HMD 1172 does not include lens-frames containing lens elements. The HMD 1172 may additionally include an on-board computing system 1176 and a video camera 1178, such as those described with respect to FIGS. 11A and 11B.

The HMD 1172 may include a single lens element 1180 that may be coupled to one of the side-arms 1173 or the center frame support 1174. The lens element 1180 may include a display such as the display described with reference to FIGS. 11A and 11B, and may be configured to overlay computer-generated graphics upon the physical-world view of the user. In one example, the single lens element 1180 may be coupled to the inner side (i.e., the side exposed to a portion of a head of a user when worn by the user) of the extending side-arm 1173. The single lens element 1180 may be positioned in front of or proximate to an eye of the user when the HMD 1172 is worn by a user. For example, the single lens element 1180 may be positioned below the center frame support 1174, as shown in FIG. 11D.

Figure 12:
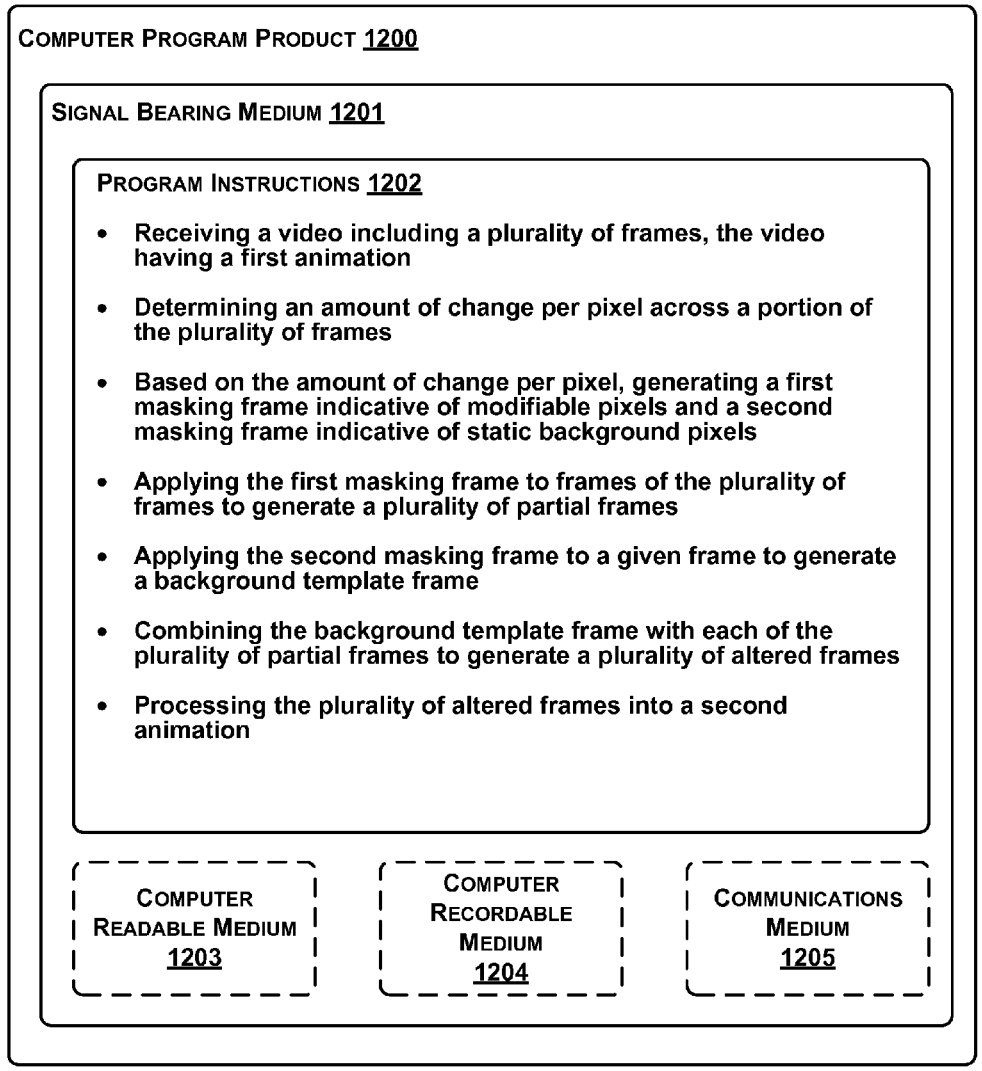
FIG. 12 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a computer-readable storage media in a machine-readable format, or on other non-transitory media or articles of manufacture. FIG. 12 is a schematic illustrating a conceptual partial view of an example computer program product 1200 that includes a computer program for executing a computer process on a computing device, arranged according to at least some embodiments presented herein. In one embodiment, the example computer program product 1200 is provided using a signal bearing medium 1201. The signal bearing medium 1201 may include one or more program instructions 1202 that, when executed by one or more processors may provide functionality or portions of the functionality described above with respect to FIGS. 1-11. Thus, for example, referring to the embodiments shown in FIG. 3, one or more features of blocks 302-314 may be undertaken by one or more instructions associated with the signal bearing medium 1201. In addition, the program instructions 1202 in FIG. 12 describe example instructions as well.

In some examples, the signal bearing medium 1201 may encompass a computer-readable medium 1203, such as, but not limited to, a hard disk drive, a Compact Disc (CD), a Digital Video Disk (DVD), a digital tape, memory, etc. In some implementations, the signal bearing medium 1201 may encompass a computer recordable medium 1204, such as, but not limited to, memory, read/write (R/W) CDs, R/W DVDs, etc. In some implementations, the signal bearing medium 1201 may encompass a communications medium 1205, such as, but not limited to, a digital and/or an analog communication medium (e.g., a fiber optic cable, a waveguide, a wired communications link, a wireless communication link, etc.). Thus, for example, the signal bearing medium 1201 may be conveyed by a wireless form of the communications medium 1205 (e.g., a wireless communications medium conforming with the IEEE 802.11 standard or other transmission protocol).

The one or more programming instructions 1202 may be, for example, computer executable and/or logic implemented instructions. In some examples, a computing device such as the computing device 1000 of FIG. 10 may be configured to provide various operations, functions, or actions in response to the programming instructions 1202 conveyed to the computing device 1000 by one or more of the computer readable medium 1203, the computer recordable medium 1204, and/or the communications medium 1205.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
   receiving a video including a plurality of frames, the video having a first animation;
   determining an amount of change per pixel across a portion of the plurality of frames;
   assigning a value to pixels quantifying the amount of change per pixel;
   based on the value being above a threshold, generating a first masking frame indicative of modifiable pixels and pixels other than the modifiable pixels set to a null value;
   based on the value being below the threshold, generating a second masking frame indicative of static background pixels;
   applying the first masking frame to frames of the plurality of frames to generate a plurality of partial frames, wherein the plurality of partial frames include the modifiable pixels that represent selected movement across the portion of the plurality of frames and pixels other than the modifiable pixels set to a null value;
   applying the second masking frame to at least one frame of the plurality of frames to generate a background template frame, wherein the background template frame includes the static background pixels that represent non-movement across the portion of the plurality of frames and pixels other than the static background pixels set to a unity value;
   combining the background template frame with each of the plurality of partial frames to generate a plurality of altered frames; and
   processing the plurality of altered frames into a video having a second animation so as to illustrate movement across the plurality of altered frames within the modifiable pixels.

2. The method of claim 1, wherein determining the amount of change per pixel across the portion of the plurality of frames comprises determining a variance of a pixel value across the portion of the plurality of frames of a corresponding pixel.

3. The method of claim 1, further comprising receiving information indicative of the threshold, wherein the threshold is based on a number of pixels to include as the modifiable pixels.

4. The method of claim 1, further comprising aligning each of the plurality of frames.

5. The method of claim 1, wherein pixel values of modifiable pixels of the first masking frame are one and wherein pixel values of the static background pixels of the second masking frame are zero.

6. The method of claim 1, wherein the second masking frame is an inverse of the first masking frame.

7. The method of claim 1,
   and wherein applying the first masking frame to frames of the plurality of frames to generate a plurality of partial frames comprises for each frame of the plurality of frames using the value of the pixel as a given value for the modifiable pixels indicated by the first masking frame to generate a given partial frame.

8. The method of claim 7, wherein combining the background template frame with each of the plurality of partial frames to generate a plurality of altered frames comprises for each frame of the plurality of altered frames replacing the value of the pixel with a corresponding pixel value of the background template frame for the static background pixels indicated by the second masking frame.

9. The method of claim 1, further comprising receiving a selection of one or more pixels to include as the modifiable pixels.

10. The method of claim 1, further comprising receiving a selection of one or more pixels to include as the static background pixels.

11. A non-transitory computer-readable medium having stored therein instructions, that when executed by a computing device, cause the computing device to perform functions comprising:
    receiving a video including a plurality of frames, the video having a first animation;
    determining an amount of change per pixel across a portion of the plurality of frames;
    assigning a value to pixels quantifying the amount of change per pixel;
    based on the value being above a threshold, generating a first masking frame indicative of modifiable pixels and pixels other than the modifiable pixels set to a null value;
    based on the value being below the threshold, generating a second masking frame indicative of static background pixels;
    applying the first masking frame to frames of the plurality of frames to generate a plurality of partial frames, wherein the plurality of partial frames include the modifiable pixels that represent selected movement across the portion of the plurality of frames and pixels other than the modifiable pixels set to a null value;

applying the second masking frame to at least one frame of the plurality of frames to generate a background template frame, wherein the background template frame includes the static background pixels that represent non-movement across the portion of the plurality of frames and pixels other than the static background pixels set to a unity value;

combining the background template frame with each of the plurality of partial frames to generate a plurality of altered frames; and processing the plurality of altered frames into a video having a second animation so as to illustrate movement across the plurality of altered frames within the modifiable pixels.

12. The non-transitory computer-readable medium of claim 11, wherein the function of determining the amount of change per pixel across the portion of the plurality of frames comprises determining the amount of change based on Euclidean color metric values per pixel.

13. The non-transitory computer-readable medium of claim 11, wherein the function of applying the first masking frame to frames of the plurality of frames to generate the plurality of partial frames comprises multiplying the frames of the plurality of frames by the first masking frame.

14. The non-transitory computer-readable medium of claim 11, further comprising the function of receiving a selection of the given frame from the plurality of frames to use to generate the background template frame.

15. A system comprising:
at least one processor;
data storage having stored therein instructions executable by the processor to perform functions comprising:
  receiving a video including a plurality of frames, the video having a first animation;
  determining an amount of change per pixel across a portion of the plurality of frames;
  assigning a value to pixels quantifying the amount of change per pixel;
  based on the value being above a threshold, generating a first masking frame indicative of modifiable pixels and pixels other than the modifiable pixels set to a null value;
  based on the value being below the threshold, generating a second masking frame indicative of static background pixels;
  applying the first masking frame to frames of the plurality of frames to generate a plurality of partial frames, wherein the plurality of partial frames include the modifiable pixels that represent selected movement across the portion of the plurality of frames and pixels other than the modifiable pixels set to a null value;
  applying the second masking frame to at least one frame of the plurality of frames to generate a background template frame, wherein the background template frame includes the static background pixels that represent non-movement across the portion of the plurality of frames and pixels other than the static background pixels set to a unity value;
  combining the background template frame with each of the plurality of partial frames to generate a plurality of altered frames; and
  processing the plurality of altered frames into a video having a second animation so as to illustrate movement across the plurality of altered frames within the modifiable pixels.

16. The system of claim 15, wherein the function of determining the amount of change per pixel across the portion of the plurality of frames comprises determining a variance of a pixel value across the portion of the plurality of frames of a corresponding pixel.

17. The system of claim 15, wherein pixel values of modifiable pixels of the first masking frame are one and wherein pixel values of the static background pixels of the second masking frame are zero.

18. The system of claim 15, wherein the functions further comprise:
receiving a selection of one or more pixels to include as the modifiable pixels; and
receiving a selection of one or more pixels to include as the static background pixels.

* * * * *